US005347393A

United States Patent [19]

Van Haaren et al.

[11] Patent Number: 5,347,393

[45] Date of Patent: Sep. 13, 1994

[54] ELECTRO-OPTICAL DISPLAY DEVICE WITH SUB-ELECTRODES

[75] Inventors: Johannes A. M. M. Van Haaren; Franciscus J. J. Blommaert; Antonius G. H. Verhulst, all of Eindhoven, Netherlands

[73] Assignee: U.S. Philips Corporation, New York, N.Y.

[21] Appl. No.: 975,178

[22] Filed: Nov. 12, 1992

[30] Foreign Application Priority Data

Nov. 19, 1991 [EP] European Pat. Off. ........ 91202999.8

[51] Int. Cl.$^5$ ........................ G02F 1/03; G02F 1/1343

[52] U.S. Cl. .................................... 359/254; 359/245; 359/320; 359/87; 345/55; 345/89

[58] Field of Search ............... 359/245, 252, 253, 254, 359/271, 320, 315, 56, 87; 340/793 (U.S. only), 784 (U.S. only); 345/55, 89

[56] References Cited

U.S. PATENT DOCUMENTS 3,940,201 2/1976 Micheron et al. .................. 359/254
4,791,417 12/1988 Bobak .................................. 340/784
4,808,991 2/1989 Tachiuchi et al. .................. 340/784
5,146,213 9/1992 Brunel et al. ....................... 340/793

FOREIGN PATENT DOCUMENTS 0316774 5/1989 European Pat. Off. ............ 359/245

*Primary Examiner*—Loha Ben
*Assistant Examiner*—Evelyn A. Lester
*Attorney, Agent, or Firm*—John C. Fox

[57] ABSTRACT

In a bistable switching display device the occurrence of artefacts due to considerable changes of periodicity between successive grey scale stages is reduced by a suitable subdivision of the electrodes (112). To this end a drive unit (116) allocates fewer than $2^n$ grey scale stages to each pixel (113) which is subdivided into n sub-pixels (113$^a$, 113$^b$, 113$^c$). The change of periodicity will decrease when a suitable division of the surface ratios and drive sequence are chosen.

9 Claims, 5 Drawing Sheets

ELECTRO-OPTICAL DISPLAY DEVICE WITH SUB-ELECTRODES

BACKGROUND OF THE INVENTION

The invention relates to a display device comprising an electro-optical medium which is switchable between two optical states and is arranged between a first supporting plate provided with row electrodes and a second supporting plate provided with column electrodes divided into n column sub-electrodes (where $n \geqq 4$), at least two of which have different widths and which define n sub-pixels at the area of a crossing with a row electrode, the device having a drive circuit for energizing combinations of column sub-electrodes associated with grey scale stages.

Such an electro-optical medium usually switches between two optical states with a steep transition characteristic (transmission/voltage characteristic curve) or, in the case of, for example, liquid crystal display devices (such as supertwist display devices or ferro-electrical display devices) with a hysteresis in this transition characteristic.

The two optical states (possibly together with polarizers and/or reflectors) define two extreme transmission levels which represent the extremes of a grey scale.

A display device of the type described in the opening paragraph is described in EP-A-0 316 774. The display device is driven in the multiplex mode, i.e., by consecutively energizing address lines (row electrodes) while the information to be written is being presented on data lines (column electrodes). Intermediate levels (grey scale stages) can be represented in such a display device by dividing the column electrodes into sub-electrodes having different surface areas (for example, in accordance with surface area ratios of 8:4:2:1).

With such an exponential subdivision ($2^p$:$2^{p-1}$:. . . :2:1) a maximum number of grey scale stages (levels) can be selected, namely $2^n$, including fully on and fully off, with a minimum number of connections of the sub-electrodes n per column. This number can be increased by also subdividing the selection (row) electrodes or by using a weighted drive.

The allocation of column sub-electrodes to be switched on is unambiguously coupled to a given grey scale stage by the exponential division of the sub-electrodes. However, the number of variations, i.e. the number of sub-pixels switching on or switching off upon transition to a next higher or next lower grey scale stage is then also fixed.

This may mean that large parts of the pixel change their optical stage in the case of such transitions. For example, for a pixel having a width ratio of 8:4:2:1 of the sub-columns, in an extreme case a transition may occur in which the widest sub-column switches from light to dark, whereas the other sub-columns switch from dark to light. In some applications, notably in projection television, such transitions as well as less extreme transitions are visible as artifacts in the image, at the recommended viewing distance (approximately 6 times the image width) and even further.

To indicate a criterion for the extent of change permissible in the case of such a transition, we refer to the change of periodicity. Periodicity is understood to mean the display, translated to amplitude and phase, of a fundamental wave related to the light/dark division across the pixel, as will be explained further hereinafter. Viewed across the width of a pixel, the transmission or reflection is to this end represented by a block function having, for example, the value of 1 for light parts and the value of 0 for dark parts. With the change described above, this function acquires a complementary value throughout the width of the pixel, and the change of periodicity is maximal.

A possible way of reducing the visibility of transitions at the viewing distance is to subdivide the column into a large number of, for example 15 sub-electrodes of equal width and to introduce the stages (levels) by starting with one sub-electrode and by switching on an adjoining sub-electrode for each subsequent stage. However, this is at the expense of the number of connections; to realize 16 stages, including fully on and fully off, 15 connections instead of 4 are then required.

OBJECTS AND SUMMARY OF THE INVENTION

One of the objects of the present invention is to provide a display device of the type described in the opening paragraph in which a grey scale can be defined with transitions between adjoining grey scale stages which (at the viewing distance) are gradual to the observer, while the number of sub-electrodes in a column remains limited to an acceptable number.

A display device according to the invention is therefore characterized in that the mutual width ratio of the column sub-electrodes, and the energization associated with grey scale stages of the column sub-electrodes cause a change of periodicity for consecutive stages in the grey scale, which change is smaller than that of a subdivision of the column electrodes into (n−1) column sub-electrodes in accordance with an exponential subdivision.

As described above, an exponential subdivision is understood to mean such a division that the surface areas of the column sub-electrodes have a mutual ratio of $2^{n-1}$:$2^{n-2}$:. . . :2:1.

The invention is based on the recognition that the use of an additional sub-electrode enables combinations of column sub-electrodes in such a way that no transitions occur at which the light/dark-related block function acquires a completely complementary value.

This can be achieved in a device according to the invention in which the grey scale has N stages including the two extreme transmission levels, by giving at least two column sub-electrodes different widths in a mutual ratio of an integer, and giving the widest of the column sub-electrodes a width which is smaller than (N/(N−1)(L/2) if N is even and smaller than (L/2) if N is odd, L being the sum of the widths of the column sub-electrodes.

Since at least two column sub-electrodes have different widths, a narrowest width can be chosen, which may be allocated to a plurality of column sub-electrodes. With a suitably chosen drive, the column sub-electrodes can be switched on at consecutive stages in such a way that the switched-on part increases by this narrowest width. By limiting the width of the widest column electrode, a transition between consecutive stages, i.e., a transition having a maximal change in periodicity, between two complementary situations, is avoided.

Changes in periodicity may be mutually compared in various manners. For example, the maximum change of periodicity, which is found for all transitions, i.e., when all grey scale stages are traversed, can be considered.

For example, the change in periodicity for each transition can be represented as the distance between points in a Fourier diagram found by plotting the block functions before and after the transition. The total path length, i.e. the sum of all distances in the Fourier diagram between the grey scale stages may also be taken as a measure of periodicity, and is referred to herein as the path norm.

A path norm is valid as a very good criterion for the total change of periodicity:

$$\sum_{j=2}^{N} \{(B_1(j) - B_1(j-1)\}^2 + \{(A_1(j) - A_1(j-1)\}^2,$$

in which $$B_1(j) = 2/L \int_0^L f_j(x) \cdot \cos(2\pi x/L)dx$$

and $$A_1(j) = 2/L \int_0^L f_j(x) \cdot \sin(2\pi x/L)dx,$$

in which $f_j(x)$ is the block pattern associated with the sub-electrodes of a pixel having a width of L for the $j^0$ stage in the grey scale, with values of 1 and 0 for the extreme values of the grey scale as a function of the position (x) within the pixel, and N is the number of grey scale stages, including the two extreme states.

It is found that for a subdivision of a column electrode into 5 sub-electrodes, a number of stages N of a grey scale with $12 \leqq N \leqq 16$ can be allocated by means of the drive circuit in such a way that artifacts are much less visible. The improvement is even better when using 6 sub-electrodes.

The maximum path norm as defined above is, for example, chosen to be 2.0. Dependent on the subdivision of the electrodes and the number of stages in the grey scale, this path norm may have a considerably lower value. Dependent on the number of stages and the number of sub-electrodes and their width distribution, this criterion is sometimes slightly more stringent, sometimes slightly less stringent than that based on the above-mentioned choice of width ratios and maximum width of the widest sub-electrode.

The number of stages N of the grey scale should be less than $2^n$ for a subdivision into n sub-electrodes, hence less than 32 in the case of 5 sub-electrodes, although better results are achieved at lower values of N, for example 12. To render the device according to the invention suitable for video applications, in which a much larger number of stages is required, this number N can be increased by also subdividing the row electrodes. These are preferably subdivided into two sub-electrodes so that a double drive frequency is sufficient. In the case of a subdivision in accordance with the ratio N:1, $N^2$ stages of the grey scale of the pixel defined by n column electrodes and two row electrodes can be realized.

On the other hand, the number of grey scale stages may be increased by use of a weighted drive, in which a first pattern in displayed during an $(N/(N+1))^{th}$ part of a frame period and a second pattern is displayed during the $(1/(N+1))^{th}$ part of the frame period. A total number of $N^2$ stages of a grey scale can then be realized again.

To simplify the modes of connection and driving, the widest row sub-electrode may be subdivided into two strips and located at both sides of the narrowest row sub-electrode, the strips being interconnected in an electrically conducting manner at one end.

BRIEF DESCRIPTION OF THE DRAWING

These and other aspects of the invention will now be described in greater detail with reference to some embodiments and the drawing in which.

DESCRIPTION OF THE PREFERRED EMBODIMENTS

Figure 1:
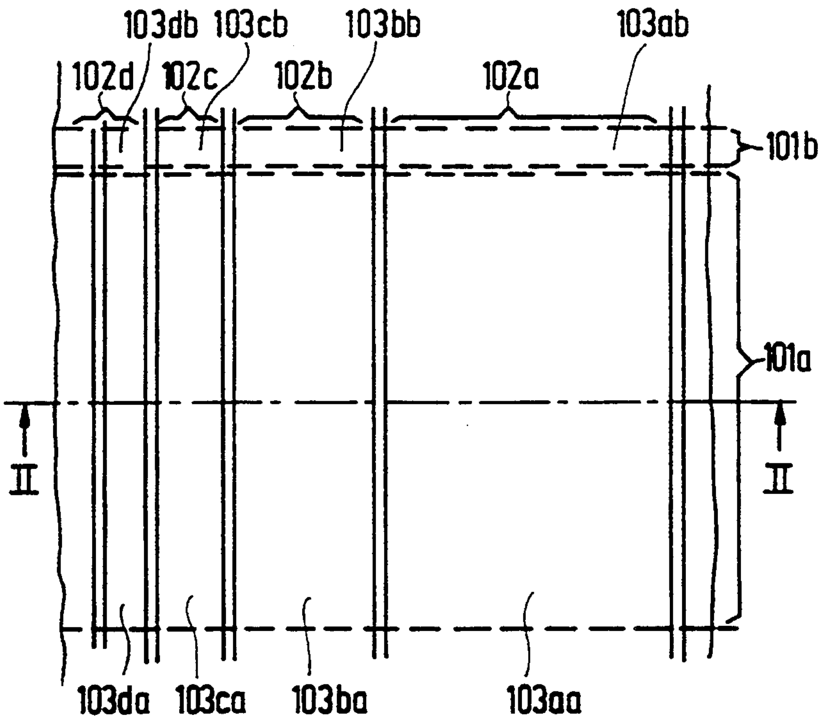
FIG.1 PRIOR ART
FIG. 1 is a diagrammatic plan view of a part of a state-of-the-art display device.
Figure 2:
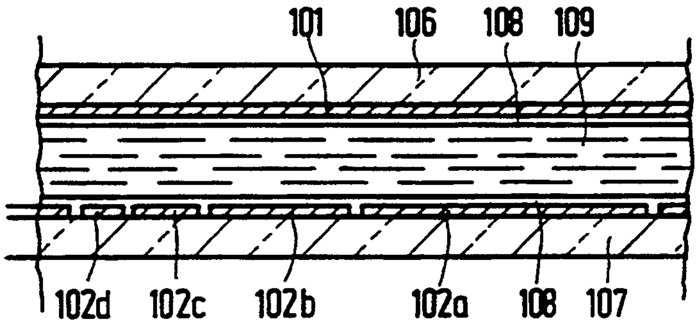
FIG.2 PRIOR ART
FIG. 2 is a diagrammatic cross-section taken on the line II—II in FIG. 1, FIGS. 3*a* and *b* are diagrammatic plan views of a part of a state-of-the-art display device at different transmission levels, FIGS. 4*a* and *b* show the associated light/dark distribution and a fundamental wave related thereto, respectively, FIGS. 5*a* and *b* show a Fourier diagram and the corresponding grey scale stages in the display device of FIG. 1 and in a modification of such a display device, respectively.

FIGS. 1 and 2 show a portion of an electro-optical display device having electrodes 101, 102, between which an electro-optical material is present. The electrodes, a row electrode 101 and a column electrode 102, are divided into sub-electrodes. The column electrode 102 is divided into sub-electrodes $\mathbf{102}^a$, $\mathbf{102}^b$, $\mathbf{102}^c$, $\mathbf{102}^d$, whose widths are in a mutual ratio of 8:4:2:1. The row electrode 101 is divided into sub-electrodes $\mathbf{101}^a$, $\mathbf{101}^b$, whose widths are in a ratio of 16:1. At the area of the crossing of the electrodes 102 (sub-electrodes $\mathbf{102}^a$, $\mathbf{102}^b$, $\mathbf{102}^c$, $\mathbf{102}^d$) and 101 (sub-electrodes $\mathbf{101}^a$, $\mathbf{101}^b$) display cells or pixels 103 are defined, which can change their electro-optical properties entirely or partly in response to signals applied to the sub-electrodes.

If a ferro-electric liquid crystal is chosen as an electro-optical material, or if the device is alternatively formed as a bistable switching device, as in a supertwist-nematic liquid crystal display, it is possible to apply such a voltage to the sub-electrodes that a given voltage threshold is exceeded and the transmission state changes locally, for example, from light-absorbing to light-transmissive, or conversely. This behavior may also be influenced by the position of polarizers, if any.

Figure 3A:
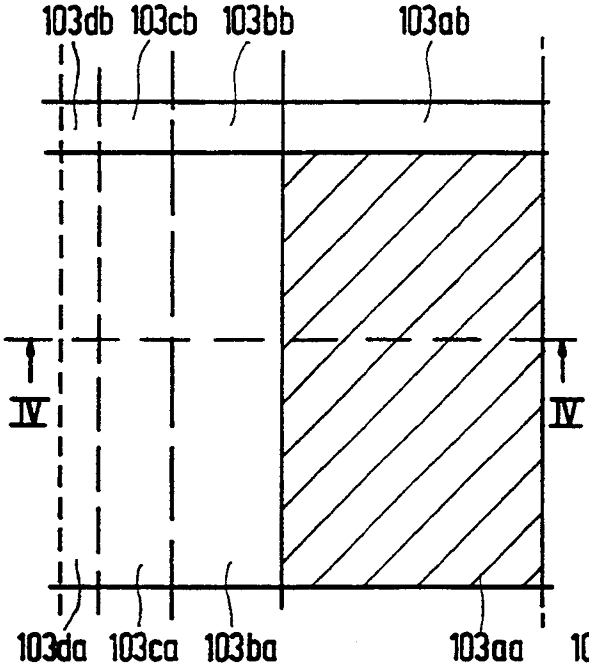
FIG. 3a PRIOR ART
Figure 3B:
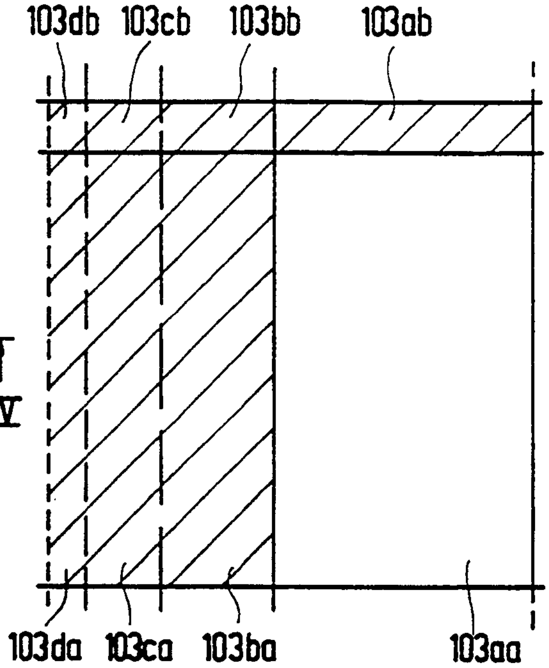
FIG. 3b PRIOR ART

If the sub-electrode $\mathbf{101}^a$ and the sub-electrode $\mathbf{102}^a$ are energized correctly, the sub-pixel $\mathbf{103}^{aa}$ of the display cell is driven so that this portion becomes, for example, light absorbing, whereas the other portions of the pixel remain light-transmissive. This drive condition is shown in FIG. 3*a*, while FIG. 3*b* shows the drive condition which is complementary thereto. By energizing the sub-electrodes 101, 102 in different manners, different sub-pixels of the display cell 103 can be driven, so that different proportions of light-transmissive/light-absorbing (white/black) are obtained for the pixel, in other words, different grey scale representations.

FIG. 2 shows diagrammatically a cross-section of a part of the device, taken on the line II—II in FIG. 1.

The electrodes 101 and 102 are provided as parallel strips of transparent conducting material (for example, indium-tin oxide) on transparent substrates 106, 107 of, for example glass or quartz. As described hereinbefore, said column electrodes 101 are divided into column sub-electrodes $\mathbf{102}^a$, $\mathbf{102}^b$, $\mathbf{102}^c$, $\mathbf{102}^d$, while the row electrodes 102 are also divided, if necessary. To give the liquid crystal molecules a given preferred direction at the location of the electrodes, the electrodes are coated with an orientation layer 108. A layer of liquid crystal material 109, in this case a ferro-electric liquid crystal material, is present between the two substrates 106, 107. The device may be used with polarizers, color filters and/or mirrors as well as an illumination source (not shown), in the conventional manner.

The sub-pixels 103 have a bistable switching behavior, in other words, they switch between two extreme states, viz. substantially completely light-transmissive and substantially completely light-absorbing. In the device of FIG. 1 (and FIG. 3) the sub-pixel $\mathbf{103}^{db}$ is the smallest switching unit. With the divisions shown, 256 stages in a grey scale can be realized, including completely dark and completely light, with a minimum number of connections, viz. 6 (4 column sub-electrodes and 2 row sub-electrodes) per pixel.

FIG. 3 shows how the change of periodicity at the transition of a grey scale stage (FIG. 3*a*, where a $127/255^{th}$ part is unshaded, i.e. light-transmissive) to a subsequent stage (FIG. 3*b* in which a $128/255^{th}$ part is light transmissive) may be maximal when using such a minimum number of connections. This type of maximal transition leads to the above-mentioned artifacts.

Figure 4A:
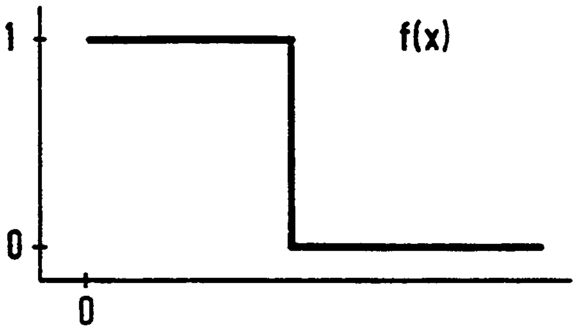
Figure 4B:
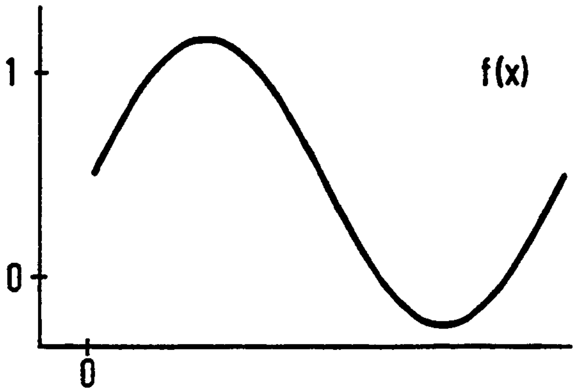

To find a qualitative criterion for avoiding such artifacts, FIG. 4*a* shows the light variation of FIG. 3*a*, taken on the line IV—IV in FIG. 3*a*. This variation is shown as a block function f(x), in which f(x)=1 for the light-transmissive part and f(x)=0 for the light-absorbing part. This block function (periodically continued) is shown in FIG. 4*b* as a periodical function F(x), given by:

$$F(x)=B_0+B_1\cos(2\Pi/L)+A_1\sin(2\Pi x/L),$$

in which $$B_0 = 1/L\int_0^L f(x)dx,$$

$$B_1 = 2/L\int_0^L f(x)\cdot\cos(2\pi x/L)dx$$

and

-continued $$A_1 = 2/L\int_0^L f(x)\cdot\sin(2\pi x/L)dx$$

It is true that F(x) is different from f(x), but this difference is found to comprise only components having wavelengths of L/2 or less, while said artifacts are found to be originating from components having the largest wavelength L (the distance between such electrodes is ignored). Also the fact that only the change of periodicity of a row sub-electrode is considered hardly influences the result of the considerations.

Figure 5A:
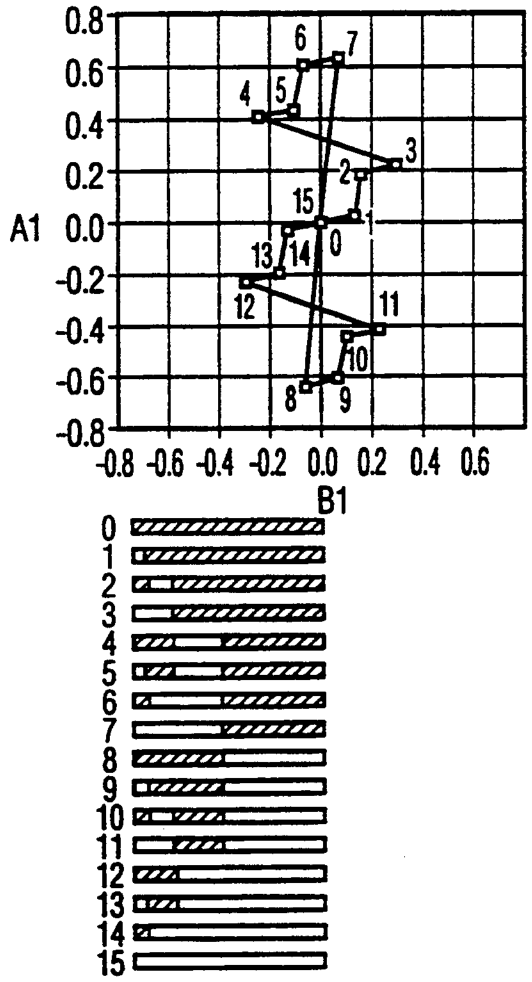

FIG. 5*a* shows graphically values of the Fourier components $A_1$, $B_1$ associated with such an exponential subdivision with 4 column sub-electrodes, and, diagrammatically, the stages 0, 1, 2, . . . , 14, 15 (N=16) in the grey scale realized with this subdivision. At the transition from stage 7 to 8 there is maximal change between light-transmissive and light-absorbing as has been described with reference to FIG. 3. This transition corresponds to a large jump or change in periodicity from point 7 to 8 in the Fourier diagram.

Figure 5B:
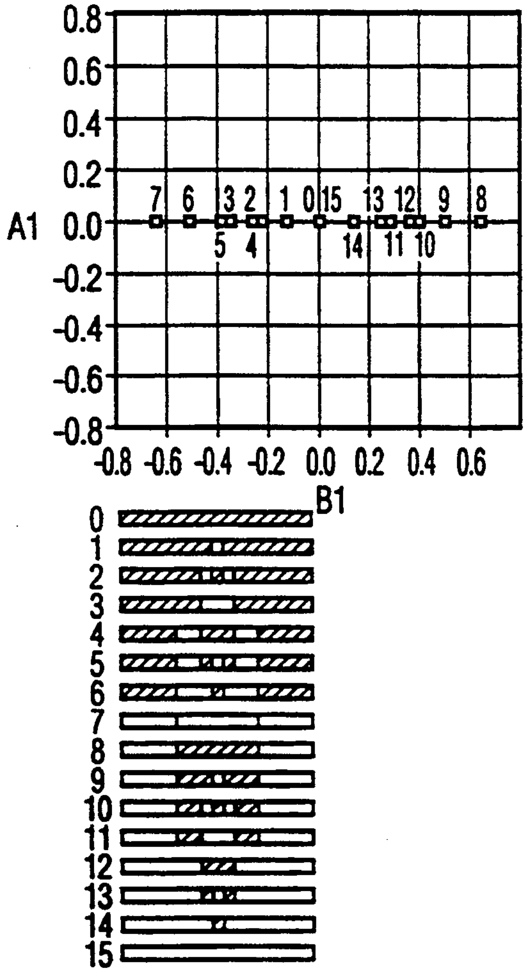

To prevent such large jumps, the widest column sub-electrodes have a maximal width which is a multiple of the width of the narrowest column sub-electrode. For a total width of L and N stages in the grey scale, the width of the narrowest column sub-electrode is $L/(N-1)$. If N is odd ((n−1) even), the widest column sub-electrodes should be narrower than (N−1)/2 units, i.e. narrower than (N−1)/2. L/(N−1)=L/2. If N is even ((N−1) odd), the widest column sub-electrodes should be narrower than N/2 units, i.e. narrower than N/2. L/N−1. The same applies to an electrode subdivision with the narrowest sub-electrode in the middle and the other electrodes split and located at both sides thereof, as diagrammatically shown in FIG. 5*b*.

Figure 6:
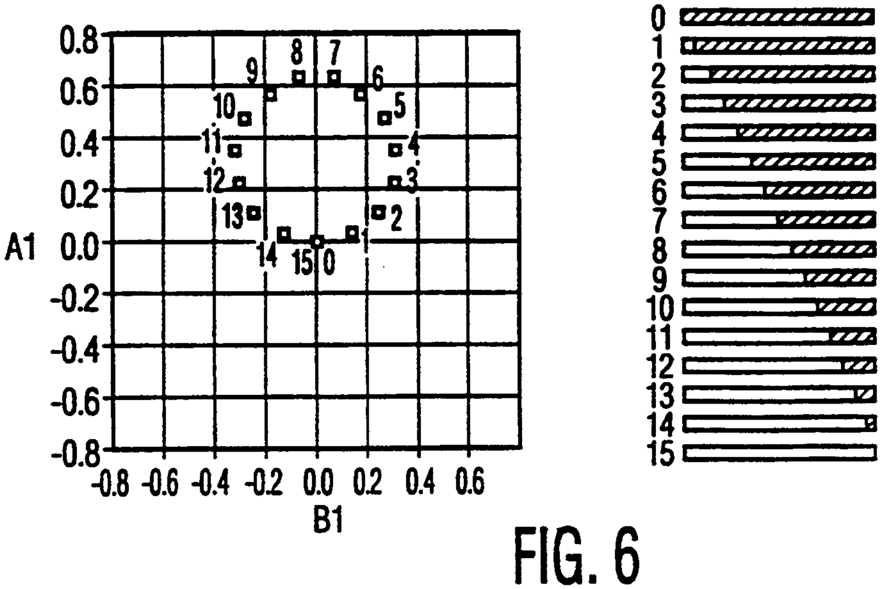
FIG. 6 shows a Fourier diagram and the corresponding grey scale stages in another display device.

FIG. 6 shows the Fourier components and the stages in a grey scale of 16 stages, realized by means of 15 sub-electrodes of the same width. Although the transitions between successive stages yields the same (relatively small) jump in the Fourier diagram, this is at the expense of an unrealistically large number of connections in practice.

Figure 7:
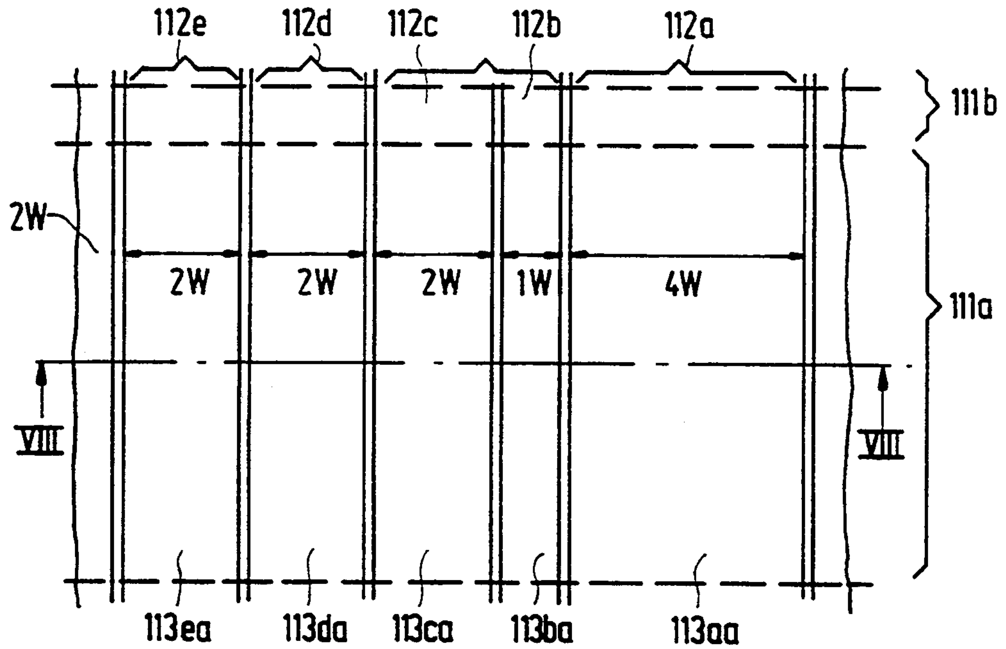
FIG. 7 is a diagrammatic plan view of a part of a display device according to the invention.
Figure 8:
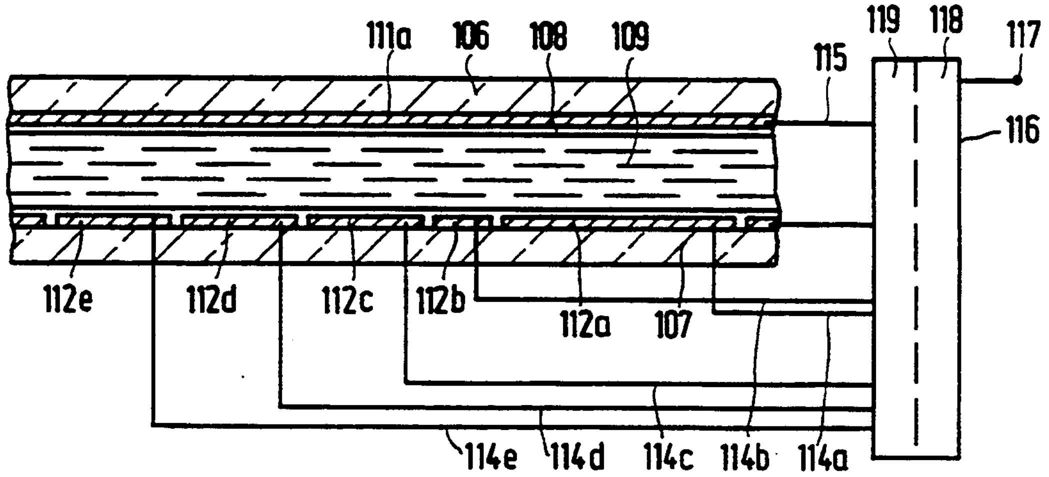
FIG. 8 is a diagrammatic cross-section taken on the line VIII—VIII in FIG. 7.

FIGS. 7 and 8 show a part of a display device according to the invention. Here the column electrodes 112 are subdivided into column sub-electrodes $\mathbf{112}^a$, $\mathbf{112}^b$, $\mathbf{112}^c$, $\mathbf{112}^d$, $\mathbf{112}^e$ whose widths are in a mutual ratio of 2:2:2:1:4. Together with the row sub-electrodes 111, these electrodes define sub-pixels 113 (FIG. 7). The sub-electrodes 111, 112 are driven via connections 114, 115 (FIG. 8) by a drive unit 116 (shown diagrammatically) which energizes the sub-electrodes 111, 112 in accordance with grey scale information associated with an incoming signal 117. To this end, the drive unit 116 comprises, for example an A/D converter 118 which generates an address of a look-up table for each grey scale value (stage). The addresses associated with successive stages then supply signals at the output of the look-up table 119 in such a way that the change of periodicity is small for successive stages and that the path norm is minimal when all grey scale stages are being traversed.

Figure 9:
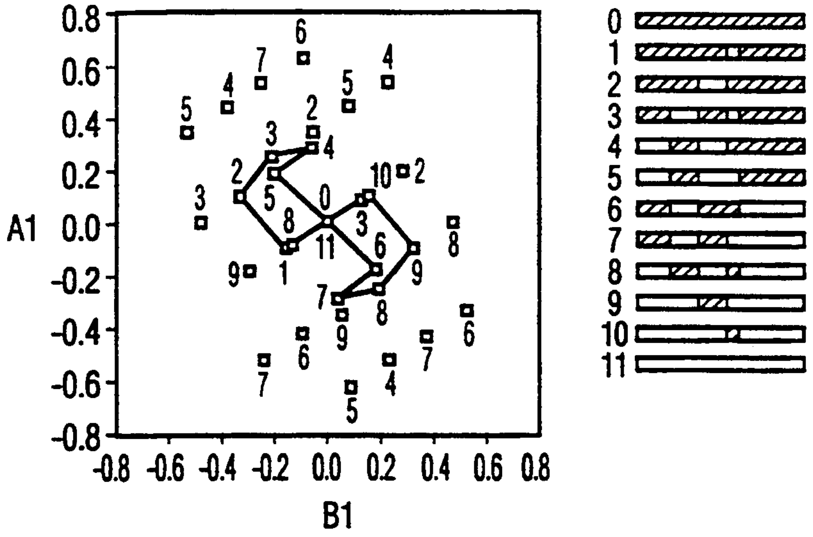
FIG. 9 shows a Fourier diagram and the corresponding grey scale stages for the device of FIGS. 7 and 8, and FIGS. 10*a* and *b* show Fourier diagrams and the corresponding grey scale stages for a display device in which drive modes according to and not according to the invention, respectively, are shown, using the same subdivision of the columns.

Sub-pixels $\mathbf{113}^{aa}$ . . . $\mathbf{113}^{ae}$ (FIG. 7) can be selected by means of the row sub-electrode $\mathbf{111}^a$ and the column sub-electrodes $\mathbf{112}^a$ . . . $\mathbf{112}^e$. The grey scale stages can now be defined in different manners, (due to the redundancy) and can be represented in different manners in an associated Fourier diagram. FIG. 9 shows the Fourier diagram with components for different realizations of these stages plotted as points 0–11, representing the associated stages 0, 1, 2 . . . 11 in the grey scale for a display device with N=12. FIG. 9 also shows by means of a solid line the path between one set of points 0–11 with the smallest path norm in accordance with the above-mentioned definition. This path norm is 0.684.

The same path norm is found when dividing the column into sub-electrodes in accordance with the ratios 4:2:2:2:1; 2:2:2:1:4; 2:2:1:4:2 or 2:1:4:2:2, in other words, in case of cyclic permutation. The same path norm is also found in case of mirroring, i.e. a width ratio of 4:1:2:2:2 and all its cyclic permutations.

Figure 10A:
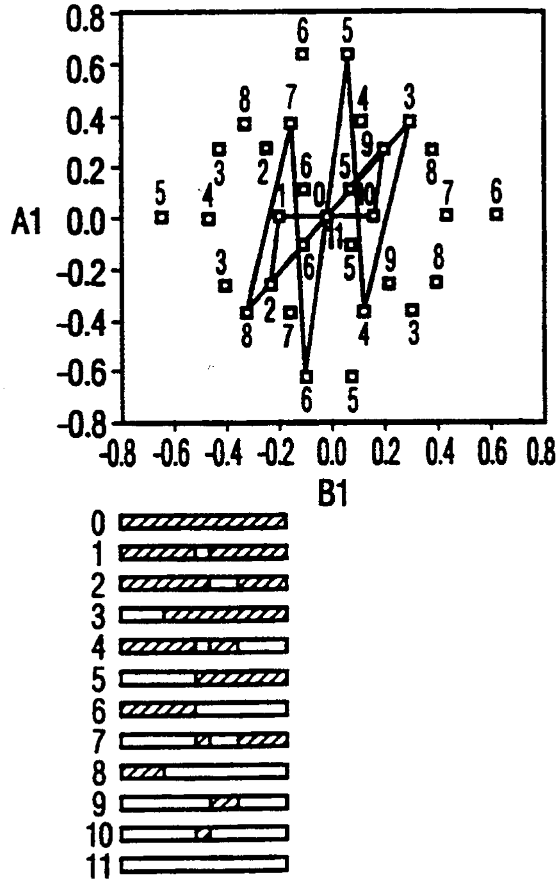
Figure 10B:
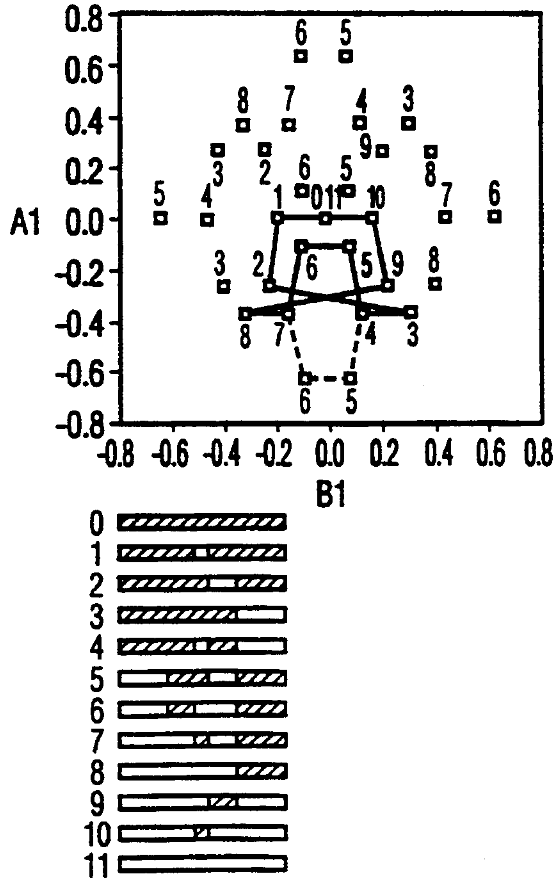

FIG. 10a shows a diagram similar to FIG. 9 and the associated grey scale stages for N=12 and for a subdivision of the column electrode in accordance with the ratio 3:2:1:2:3. The solid line shows the path having the smallest path norm (1.046). The broken line illustrates another allocation having the same path norm. For comparison, the solid line in FIG. 10b indicates how the diagram is traversed in case of a completely different allocation, in this case the worst possible allocation, and the related grey scale stages. The path norm is 6.23 in this case.

As already noted, the number of grey scale stages may be increased, for example by dividing the row electrode 111 into row sub-electrodes 111a, 111b as is shown in FIG. 7, with a mutual width ratio of N:1. This increases the number of stages to $N^2$. The drive unit 116 then subdivides the signal 117 into sub-signals for the row sub-electrodes. The widest row sub-electrode may be subdivided into two strips and located at both sides of the narrowest row sub-electrode, which strips are interconnected in a conducting manner at one end. This enables a simpler connection at both sides.

The display device may also be driven with a weighted drive. The drive unit 116 then divides, for example, the incoming signal 117 into sub-signals. The sub-signals address the look-up table via the A/D converter in such a way that the most significant part of the stage-defining information drives the sub-electrodes 112 during an $(N/(N+1))^{th}$ part of a frame period and the other information drives the sub-electrodes 112 during an $(1/(N+1))^{th}$ part.

Different divisions of the column sub-electrodes are alternatively possible. Some possible subdivisions are given in Table I for n=4 and in Table II for n=5, together with the path norm as defined above.

TABLE I

| N | best sub-division | path norm | second-best sub-division | path norm |
|---|---|---|---|---|
| 12 | 1-4-2-4 | 1.795 | 1-2-3-5 | 1.953 |
| 13 | 1-2-3-6 | 2.352 | 1-2-4-5 | 2.758 |
| 14 | 1-2-3-7 | 2.264 | 1-2-6-4 | 2.333 |
| 15 | 1-2-7-4 | 2.408 | 1-2-4-7 | 2.653 |
| 16 | 1-2-4-8 | 2.514 | this is the exponential subdivision | |

TABLE II

| N | best sub-division | path norm | second-best sub-division | path norm |
|---|---|---|---|---|
| 12 | 1-2-2-2-4 | 0.684 | 1-2-2-4-2 | 0.770 |
| 13 | 1-2-3-4-2 | 0.948 | 1-2-2-5-2 | 1.042 |
| 14 | 1-2-3-3-4 | 0.874 | 1-2-2-3-5 | 1.020 |
| 15 | 1-2-5-2-4 | 1.173 | 1-5-1-5-2 | 1.205 |

TABLE II-continued

| N | best sub-division | path norm | second-best sub-division | path norm |
|---|---|---|---|---|
| 16 | 1-2-3-4-5 | 1.257 | 1-2-5-2-5 | 1.264 |

It is apparent from the Tables that not only the width ratio but also the arrangement of the sub-electrodes across the column electrode influence the path norm. For example, the combinations (n=4, N=15) and (n=5, N=12) result in different values of the path norm for different arrangements of the sub-electrodes across the column electrodes.

The width ratio of the sub-electrodes need not be maintained beyond the display area. For external connections, the narrower electrodes at the edge of the display device may be wider.

The invention need not only be used for display devices comprising a bistable electro-optical medium, but may also be used for display devices having such a steep transmission/voltage characteristic curve that in practice are only driven in the on and off-states, and even for display devices having a gradual transmission/voltage characteristic curve in which only the on and off-states are chosen.

We claim:

1. A display device comprising an electro-optical medium which is switchable between two optical states and is arranged between a first supporting plate provided with row electrodes and a second supporting plate provided with column electrodes, the column electrodes defining pixels at areas of crossing with a row electrode, the column electrodes divided into n column sub-electrodes (n≧4) and defining n sub-pixels at areas of crossing with a row electrode, at least two of which column sub-electrodes in each column have different widths, said device also comprising a drive circuit for energizing combinations of column sub-electrodes associated with grey scale stages, characterized in that the combination of the width ratios of the column sub-electrodes and the energizations of the column sub-electrodes representing N grey scale stages including two extreme transmission levels, causes a change of periodicity for consecutive stages in the grey scale, which change is smaller than that resulting from a subdivision of the column electrodes into (n−1) column sub-electrodes in accordance with an exponential subdivision.

2. A display device as claimed in claim 1, characterized in that the at least two column sub-electrodes having different widths, are in a mutual width ratio of an integer, and the widest column sub-electrodes having a width which is smaller than (N/(N−1)).(L/2) when N is even and smaller than (L/2) when N is odd, L being the sum of the widths of the column sub-electrodes.

3. A display device as claimed in claim 1, characterized in that the total change in periodicity is determined by a path norm:

$$\sum_{j=2}^{N} \{(B_1(j) - B_1(j-1)\}^2 + \{(A_1(j) - A_1(j-1)\}^2,$$

in which $$B_1(j) = 2/L \int_0^L f_j(x) \cdot \cos(2\pi j/L)dx$$

-continued and $$A_1(j) = 2/L \int_0^L f_j(x) \cdot \sin(2\pi x/L)dx,$$

and $f_j(x)$ is a block pattern (for a $j^0$ stage in the grey scale) associated with a pixel having a width L, $f_j(x)$ having values of 1 and 0 for the extreme levels of the grey scale as a function of a position (x) within the pixel, and N is the number of grey scale stages, including the two extreme levels.

4. A display device as claimed in claim 1, characterized in that a row electrode is divided into two row sub-electrodes having a mutual width ratio of 1:N, and defining at the area of the pixel together with the column sub-electrodes N stages of the grey scale.

5. A display device as claimed in claim 2, characterized in that the drive circuit comprises means for dividing an incoming signal into two sub-signals of information defining the grey scale stages, one sub-signal having a most significant part of the information and driving the column sub-electrodes during an $(N/(N+1))^{th}$ part of a frame period, and the other sub-signal having the remaining part of the information driving the column sub-electrodes during an $(1/(N+1))^{th}$ part of the frame period.

6. A display device as claimed in claim 2, characterized in that a row electrode is divided into two row sub-electrodes having a mutual width ratio of 1:N, and defining at the area of the pixel together with the column sub-electrodes N stages of the grey scale.

7. A display device as claimed in claim 3, characterized in that a row electrode is divided into two row sub-electrodes having a mutual width ratio of 1:N, and defining at the area of the pixel together with the column sub-electrodes N stages of the grey scale.

8. A display device as claimed in claim 3, characterized in that the drive circuit comprises means for dividing an incoming signal into two sub-signals of information defining the grey scale stages, one sub-signal having a most significant part of the information and driving the column sub-electrodes during an $(N/(N+1))^{th}$ part of a frame period, and the other sub-signal having the remaining part of the information driving the column sub-electrodes during an $(1/(N+1))^{th}$ part of the frame period.

9. A display device comprising an electro-optical medium which is switchable between two optical states and is arranged between a first supporting plate provided with row electrodes and a second supporting plate provided with column .electrodes, the column electrodes defining pixels at the areas of crossing with a row electrode, the column electrodes divided into n column subelectrodes (n≧4) which define n sub-pixels at areas of crossing with a row electrode, characterized in that the column sub-electrodes have a mutual width ratio selected from the group of ratios listed in the Table below and cyclic permutations of these ratios:

| n = 4 | n = 5 |
|---|---|
| 1:4:2:4 | 1:2:2:2:4 |
| 1:2:3:5 | 1:2:3:4:2 |
| 1:2:3:6 | 1:2:3:3:4 |
| 1:2:3:7 | 1:2:5:2:4 |
| 1:2:7:4 | 1:2:3:4:5 |
| 1:2:6:4 | 1:2:2:4:2 |
| | 1:2:2:5:2 |
| | 1:2:2:3:5 |
| | 1:5:1:5:2 |
| | 1:2:5:2:5 |

* * * * *